US011166212B2

(12) United States Patent
Kumar et al.

(10) Patent No.: US 11,166,212 B2
(45) Date of Patent: Nov. 2, 2021

(54) ELEVATION BASED MODE SWITCH FOR 5G BASED AERIAL UE

(71) Applicant: QUALCOMM Incorporated, San Diego, CA (US)

(72) Inventors: Akash Kumar, Hyderabad (IN); Mridul Agarwal, Jodhpur (IN); Hargovind Prasad Bansal, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 16/519,860

(22) Filed: Jul. 23, 2019

(65) Prior Publication Data

US 2020/0037219 A1 Jan. 30, 2020

(30) Foreign Application Priority Data

Jul. 26, 2018 (IN) .............................. 201841028145

(51) Int. Cl.
*H04W 36/08* (2009.01)
*H04B 17/318* (2015.01)
(Continued)

(52) U.S. Cl.
CPC .............. *H04W 36/08* (2013.01); *B64C 19/00* (2013.01); *H04B 17/318* (2015.01);
(Continued)

(58) Field of Classification Search
CPC ..... H04W 36/08; H04W 24/10; H04W 36/30; H04W 36/32; H04W 36/36;
(Continued)

(56) References Cited

U.S. PATENT DOCUMENTS 4,475,010 A * 10/1984 Huensch .............. H04B 7/2621
370/334
6,697,642 B1 * 2/2004 Thomas ............... H01Q 3/2605
342/374

(Continued)

OTHER PUBLICATIONS

J. Wang, C. Jiang, Z. Han, Y. Ren, R. G. Maunder and L. Hanzo, "Taking Drones to the Next Level: Cooperative Distributed Unmanned-Aerial-Vehicular Networks for Small and Mini Drones," in IEEE Vehicular Technology Magazine, vol. 12, No. 3, pp. 73-82, Sep. 2017, doi: 10.1109/MVT.2016.2645481. (Year: 2017).*

(Continued)

*Primary Examiner* — Ayaz R Sheikh
*Assistant Examiner* — Tarell A Hampton
(74) *Attorney, Agent, or Firm* — Qualcomm Incorporated

(57) ABSTRACT

Methods, apparatuses, and computer-readable mediums for wireless communication are disclosed by the present disclosure. In an example, a user equipment (UE) may be located on an unmanned aerial vehicle (UAV). The UE may monitor at least one of an elevation of the UE or a number of cells detected by the UE. The UE may determine that the elevation of the UE exceeds an elevation threshold or the number of cells detected by the UE exceeds a cell threshold. The UE may determine a current communication mode of the UE. The UE may switch to a directional transmit mode, in response to determining that the current communication mode is an omnidirectional transmit mode and at least one of the elevation of the UE exceeds the elevation threshold or the number of cells detected by the UE exceeds the cell threshold.

27 Claims, 8 Drawing Sheets

(51) Int. Cl.
*B64C 19/00* (2006.01)
*H04W 24/10* (2009.01)
*H04W 36/30* (2009.01)
*H04W 36/32* (2009.01)
*H04W 36/36* (2009.01)
*H04W 84/04* (2009.01)

(52) U.S. Cl.
CPC ............ *H04W 24/10* (2013.01); *H04W 36/30* (2013.01); *H04W 36/32* (2013.01); *H04W 36/36* (2013.01); *B64C 2201/141* (2013.01); *H04W 84/042* (2013.01)

(58) Field of Classification Search
CPC ... H04W 84/042; H04W 36/20; H04W 88/06; H04B 17/318; H04B 7/02; H04B 7/0617; H04B 7/0686; B64C 19/00; B64C 2201/141
See application file for complete search history.

(56) References Cited

U.S. PATENT DOCUMENTS

| | | | | |
|---|---|---|---|---|
| 7,321,580 | B1* | 1/2008 | Ramanathan | H04W 74/0816 370/252 |
| 10,084,529 | B1* | 9/2018 | Riechers | H04W 84/06 |
| 2004/0023693 | A1* | 2/2004 | Okawa | H04W 36/12 455/562.1 |
| 2005/0202859 | A1* | 9/2005 | Johnson | H04B 7/0408 455/575.7 |
| 2010/0014458 | A1* | 1/2010 | Singh | H04W 72/048 370/328 |
| 2011/0143673 | A1* | 6/2011 | Landesman | H01Q 1/1257 455/63.1 |
| 2012/0034917 | A1* | 2/2012 | Kazmi | H04W 48/16 455/434 |
| 2012/0044108 | A1* | 2/2012 | Frigon | H01Q 25/00 342/368 |
| 2013/0142136 | A1* | 6/2013 | Pi | H04B 7/1555 370/329 |
| 2014/0056177 | A1* | 2/2014 | Kneckt | H04W 48/16 370/255 |
| 2014/0253380 | A1* | 9/2014 | Choi | H04B 7/0602 342/367 |
| 2016/0119902 | A1* | 4/2016 | Cheong | H04W 72/0413 370/329 |
| 2016/0330771 | A1* | 11/2016 | Tan | H04W 72/08 |
| 2016/0381591 | A1* | 12/2016 | Lysejko | H01Q 1/246 370/252 |
| 2017/0005714 | A1* | 1/2017 | Lu | H04B 7/0632 |
| 2017/0150373 | A1 | 5/2017 | Brennan et al. | |
| 2017/0346542 | A1* | 11/2017 | Neves | H04W 48/20 |
| 2018/0097559 | A1 | 4/2018 | Jalali | |
| 2019/0029055 | A1* | 1/2019 | Hor-Lao | H04B 7/0689 |
| 2019/0373635 | A1* | 12/2019 | Yang | H04B 7/0408 |
| 2019/0387572 | A1* | 12/2019 | Nam | H04W 72/046 |
| 2020/0033849 | A1* | 1/2020 | Yiu | H04B 7/18506 |

OTHER PUBLICATIONS

Sundaresan K, Chai E, Chakraborty A, Rangarajan S. SkyLiTE: End-to-end design of low-altitude UAV networks for providing LTE connectivity. arXiv preprint arXiv: 1802.06042. Feb. 16, 2018. (Year: 2018).*

CMCC, et al., "Consideratien of the Number of Actual Good Beams in Cell Reselection", 3GPP TSG RAN WG2 Meeting # 101-Bis, 3GPP Draft R2-1805519 Consideration of the Number of Actual Good Beams in Cell Reselection, 3rd Generation Parternship Project (3GPP), Mobile Competence Centre; 650, Route Des Lucicles; F-06921 SOP, vol. RAN WG2, No. Sanya, China; Apr. 16, 2018-Apr. 20, 2018, Apr. 14, 2018 (Apr. 14, 2018), 2 Pages, XP051429170, Retrieved from the Internet, URL: http://www.3gpp.org/ftp/Meetings%5F3GPP%5FSYNC/RAN2/Docs/ [retrieved on Apr. 14, 2018] the whole document.

Ericsson: "Potential Enhancements for UAV Interference Problem", 3GPP TSG-RAN WG2 Meeting#98, 3GPP Draft: R2-1705426 Potential Enhancements for UAV Interference Problem, 3rd Generation Partnership Project (3GPP), Mobile Competence Centre; 650, Routes Des Lucioles; F-06921 Sophia-Antipolis CED, vol. RAN WG2, No. Hangzhou, China; May 15, 2017-May 19, 2017, May 14, 2017 (May 14, 2017), pp. 1-2, XP051275822, Retrieved from the Internet: URL: http:/www.3gpp.org/ftp/Meetings_3GPP_SYNC/RAN2/Docs/ (retrieved on May 14, 2017) the whole document.

International Search Report and Written Opinion—PCT/US2019/043273—ISA/EPO—dated Sep. 26, 2019.

Qualcomm Snapdragon: "Qualcomm Technologies, Inc. LTE Unmanned Aircraft Systems v1.0.1," May 12, 2017 (May 12, 2017), pp. 1-65, XP055577111, Internet Retrieved from the Internet: URL: https://www.qualcomm.com/media/documents/files/lte-unmanned-aircraft-systems-trial-report.pdf [retrieved on Apr. 3, 2019] Sections 1 and 2.

* cited by examiner

ELEVATION BASED MODE SWITCH FOR 5G BASED AERIAL UE

CLAIM OF PRIORITY UNDER 35 U.S.C. § 119

This application claims priority to Indian Application Number 201841028145, titled "ELEVATION BASED MODE SWITCH FOR 5G BASED AERIAL UE," filed Jul. 26, 2018, which is assigned to the assignee hereof, and incorporated herein by reference in its entirety.

BACKGROUND

Technical Field

The present disclosure relates generally to communication systems, and more particularly, techniques for a drone user equipment (UE) in 5G New Radio (5G NR).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (5G NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

For example, a UE located on an unmanned aerial vehicle (UAV) and served by a serving base station of a commercial radio network may cause interference to non-serving base stations. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, apparatuses, and computer-readable mediums for wireless communication are disclosed by the present disclosure. In an aspect, the disclosure provides a method of wireless communications for an aerial UE. The method may include monitoring, by the UE, which may be located on an unmanned aerial vehicle (UAV), at least one of an elevation of the UE or a number of cells detected by the UE. The method may include determining that the elevation of the UE exceeds an elevation threshold and/or or the number of cells detected by the UE exceeds a cell threshold. The method may include determining, by the UE, a current communication mode of the UE. The method may include switching to a directional transmit mode, in response to determining that the current communication mode is an omnidirectional transmit mode and at least one of the elevation of the UE exceeds the elevation threshold or the number of cells detected by the UE exceeds the cell threshold.

In another aspect, the disclosure provides a UAV for wireless communication. The UAV may include a memory and a processor in communication with the memory. The processor may be configured to monitor, by an aerial UE located on the UAV, at least one of an elevation of the UE or a number of cells detected by the UE. The processor may be configured to determine that the elevation of the UE exceeds an elevation threshold or the number of cells detected by the UE exceeds a cell threshold. The processor may be configured to determine, by the UE, a current communication mode of the UE. The processor may be configured to switch to a directional transmit mode, in response to determining that the UE is operating in an omnidirectional transmit mode and at least one of the elevation of the UE exceeds the elevation threshold or the number of cells detected by the UE exceeds the cell threshold.

In another aspect, the disclosure provides another UAV for wireless communication. The UAV may include means for monitoring, by a UE located on the UAV, at least one of an elevation of the UE or a number of cells detected by the UE. The UAV may include means for determining that the elevation of the UE exceeds an elevation threshold or the number of cells detected by the UE exceeds a cell threshold. The UAV may include means for determining, by the UE, a current communication mode of the UE. The UAV may include means for switching to a directional transmit mode, in response to determining that the UE is operating in an omnidirectional transmit mode and the elevation of the UE exceeds the elevation threshold or the number of cells detected by the UE exceeds the cell threshold.

In another aspect, the disclosure provides a computer-readable medium storing computer code executable by a processor for wireless communications. The computer-readable medium, e.g., a non-transitory computer-readable medium, may include code to monitor, by an aerial UE located on a UAV, at least one of an elevation of the UE or a number of cells detected by the UE. The computer-readable medium may include code to determine that the elevation of the UE exceeds an elevation threshold or the number of cells detected by the UE exceeds a cell threshold. The computer-readable medium may include code to determine, by the UE, a current communication mode of the UE. The computer-readable medium may include code to switch to a directional transmit mode, in response to determining that the UE is operating in an omnidirectional transmit mode and at least one of the elevation of the UE exceeds the elevation threshold or the number of cells detected by the UE exceeds the cell threshold.

In another aspect, the disclosure provides a method of wireless communications for a serving cell. The method may include receiving, from a UE located on a UAV and served by the serving cell, a mode switch request. The method may include determining a set of neighbor cells satisfying the mode switch request. The method may include transmitting a neighbor cell list including the set of neighbor cells to the UE. The method may include receiving a measurement report from the UE identifying one of the neighbor cells. The method may include performing a handover of the UE to the identified neighbor cell.

In another aspect, the disclosure provides a base station for operating a serving cell. The base station may include a memory and a processor in communication with the memory. The processor is configured to receive, from a UE located on a UAV and served by the serving cell, a mode switch request. The processor is configured to determine a set of neighbor cells satisfying the mode switch request. The processor is configured to transmit a neighbor cell list including the set of neighbor cells to the UE. The processor is configured to receive a measurement report from the UE identifying one of the neighbor cells. The processor is configured to perform a handover of the UE to the identified neighbor cell.

In another aspect, the disclosure provides a base station for operating a serving cell. The base station may include means for receiving, from a UE located on an UAV and served by the serving cell, a mode switch request. The base station may include means for determining a set of neighbor cells satisfying the mode switch request. The base station may include means for transmitting a neighbor cell list including the set of neighbor cells to the UE. The base station may include means for receiving a measurement report from the UE identifying one of the neighbor cells. The base station may include means for performing a handover of the UE to the identified neighbor cell.

In another aspect, the disclosure provides a computer-readable medium storing computer code executable by a processor for wireless communications. The computer-readable medium includes code to receive, from a UE located on an UAV and served by the serving cell, a mode switch request. The computer-readable medium includes code to determine a set of neighbor cells satisfying the mode switch request. The computer-readable medium includes code to transmit a neighbor cell list including the set of neighbor cells to the UE. The computer-readable medium includes code to receive a measurement report from the UE identifying one of the neighbor cells. The computer-readable medium includes code to perform a handover of the UE to the identified neighbor cell.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
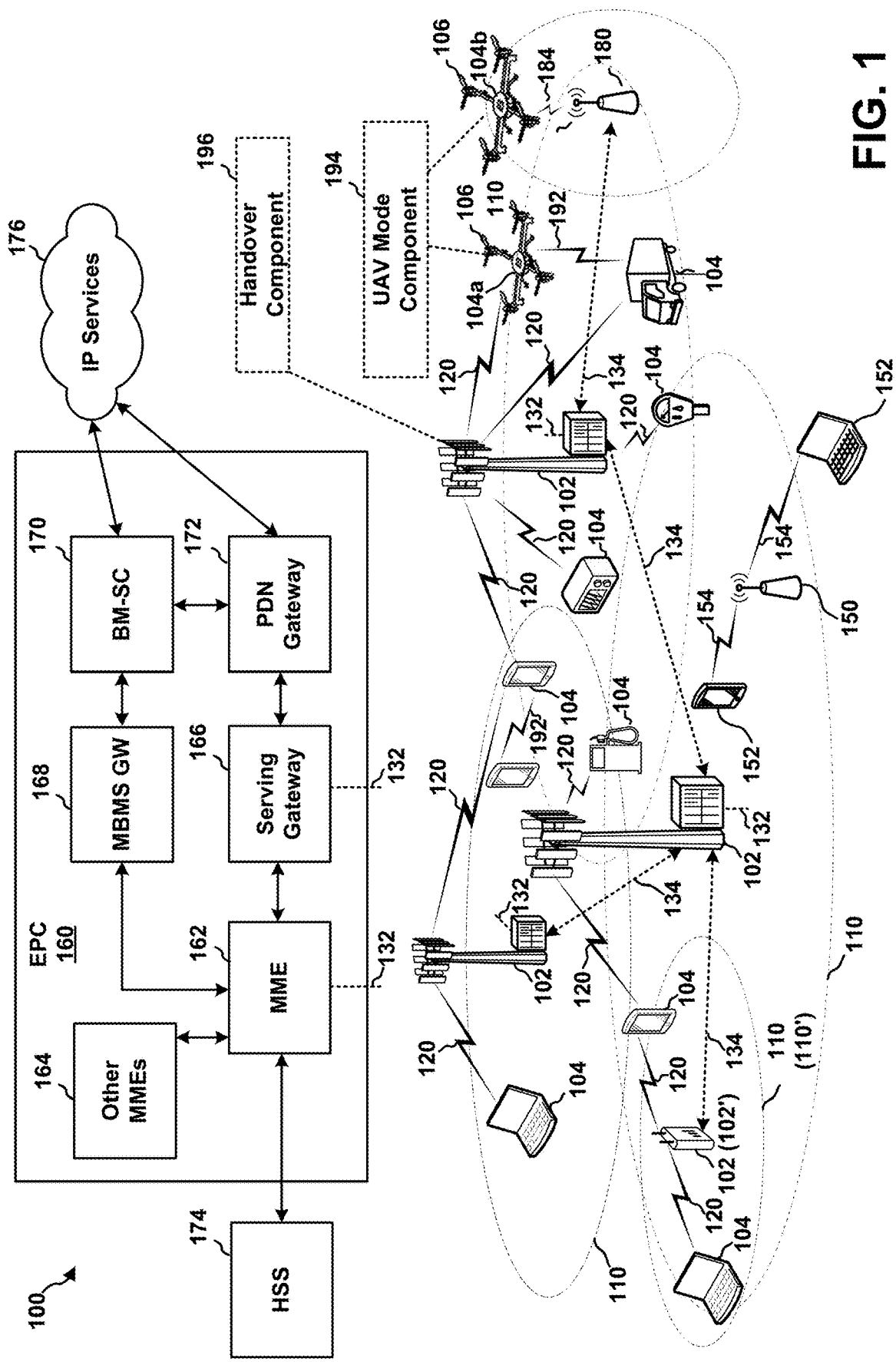
FIG. 1 is a block diagram illustrating an example of a wireless communications system and an access network.

Methods, apparatuses, and computer-readable mediums for wireless communication are disclosed by the present disclosure. In an example, a UE located on an unmanned aerial vehicle (UAV) may switch transmission modes based on an altitude/elevation or a number of detected base stations in order to mitigate uplink interference to the detected base stations. The UE may switch to a directional transmission mode (e.g., using a frequency band>28 GHz) when the UAV has an elevation greater than a threshold or the number of detected base station is greater than a threshold.

A UE located on a UAV may be served by a commercial wireless wide area network (WWAN) while flying at altitudes up to approximately 400 feet. A UAV may be subject to various regulations, varying among countries, states, cities, other jurisdictions, and additional specially restricted zones. The regulations may restrict or specify certain altitudes for UAV operation. The UAV may also change altitude due to multiple factors such as navigation, collision avoidance, wind speed, etc. At a higher altitude, the UE may have a line-of-sight coverage to the serving cell as well as multiple other cells. In an example simulation, the uplink signal strength received from a UE in the sky is strong compared to a UE on the ground. However, interference from such a UE may also be strong. Uplink transmission from a UE located on a UAV above an elevation threshold may cause significant interference to the other neighbor cells.

In 5G New Radio (5G NR), operation may be broadly classified into two transmission modes. An omnidirectional transmission mode may be used for carrier frequencies less than 6 GHz. A directional transmission mode may be used for carrier frequencies greater than 28 GHz, which may be referred to as a true millimeter wave (mmW) mode.

The present disclosure provides techniques for mitigating interference to neighboring cells from UEs located in or on UAVs. For example, when a UE located on a UAV is operating above a threshold altitude, the UE may switch to a directional transmission mode and utilize a narrow beam for uplink transmissions to the serving base station or cell. As another example, when a UE located on a UAV detects a number of cells that exceeds a cell threshold, the UE may switch to the direction transmission mode. The number of cells detected by the UE may be a proxy for elevation or altitude and may also be used to estimate interference. Thresholds may also be based on a combination of elevation or altitude and a number of detected cells. In either example, switching to the directional transmission mode may decrease the interference to other cells caused by uplink transmissions from the UE.

In an aspect, a serving cell may be configured for a particular transmission mode. In order to change transmission modes, the UE may perform a cell change to another serving cell. In an aspect, the UE may transmit a mode switch request to initiate a mode switch handover. For example, a mode switch request may indicate a desired transmit mode or conditions that imply a desired transmit mode. The serving cell may assist the mode switch by providing a list of neighbor cells that satisfy the desired transmit mode. The UE may then measure the list of neighbor cells and provide a measurement report. The serving cell may then handover the UE based on the measurement report. In an aspect, the UE may alter the measurement report to favor serving cells that satisfy the desired transmit mode. Accordingly, the serving cell may effectively allow the UE to select a transmission mode that reduces interference by handing the UE over following a mode switch request.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and a core network, which may include an Evolved Packet Core (EPC) 160 and/or another core network such as a 5G core (5GC). The base stations 102 may include macro cells (high power cellular base station) and/or small cell base stations (low power cellular base station). The UEs 104 may include one or more UEs, such as UE 104a and UE 104b, which are located on a respective UAV 106. In an aspect, a UE 104 that is located on a UAV 106 may be integrated with the UAV 106, for example, to provide a data connection for controlling or communicating with the UAV 106. In another aspect, the UE 104 may be a payload of the UAV 106 and perform a function separate from the UAV 106. In an aspect, the UE 104 may be located within an enclosed structure or body of the UAV 106. In another aspect, the UE 104 may be located on a platform or surface of the UAV 106. In some examples, the UE 104 may be carried by a passenger on an aerial vehicle.

The UAV 106 may include any type of unmanned aerial vehicle. For example, the UAV 106 may be one of a drone, helicopter, multi-rotor copter (e.g., quadcopter), balloon, blimp, dirigible, fixed-wing aircraft, or any other vehicle capable of flying and being controlled remotely.

Figure 5:
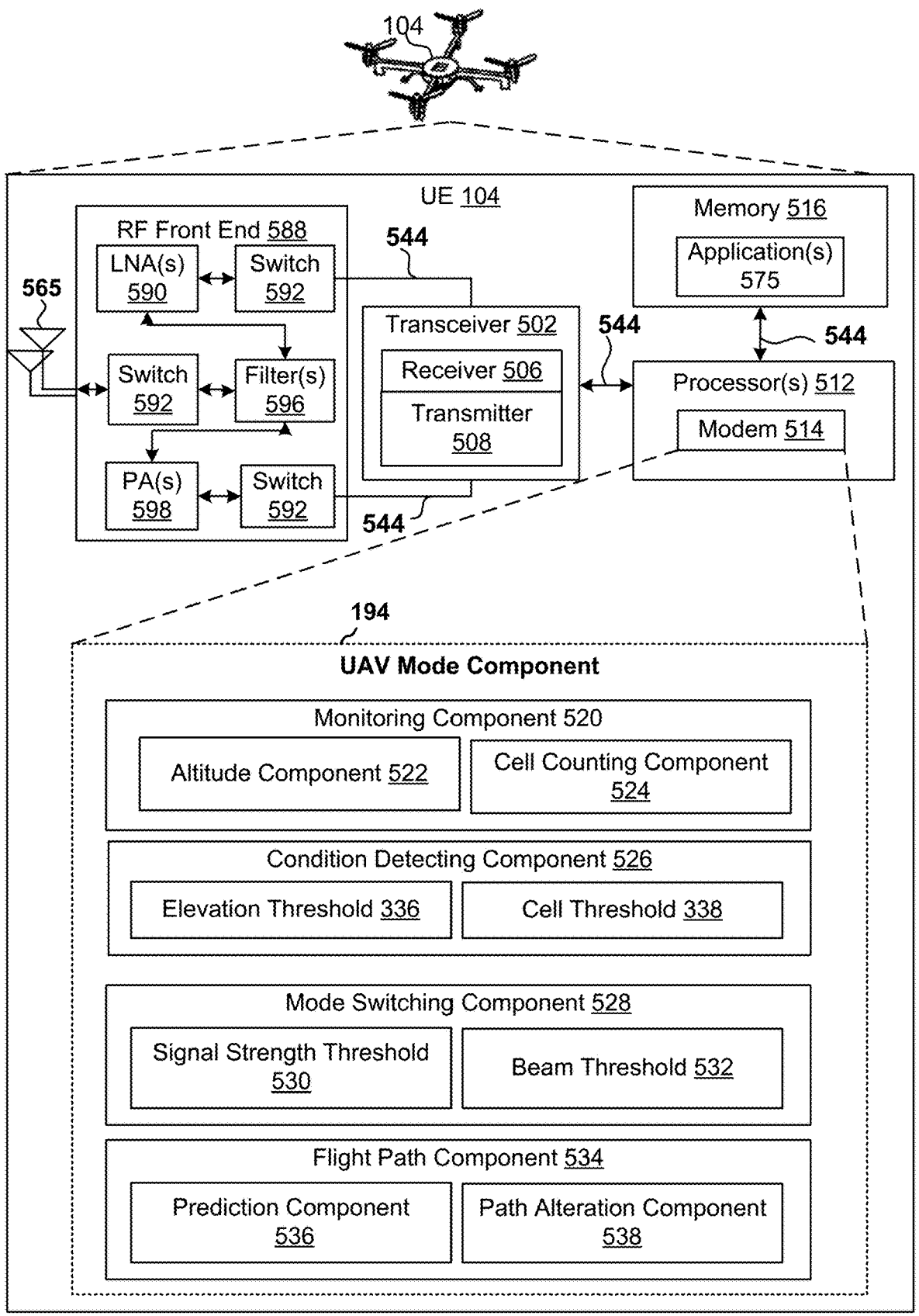
FIG. 5 is a schematic diagram of example components of the UE of FIG. 1.
Figure 6:
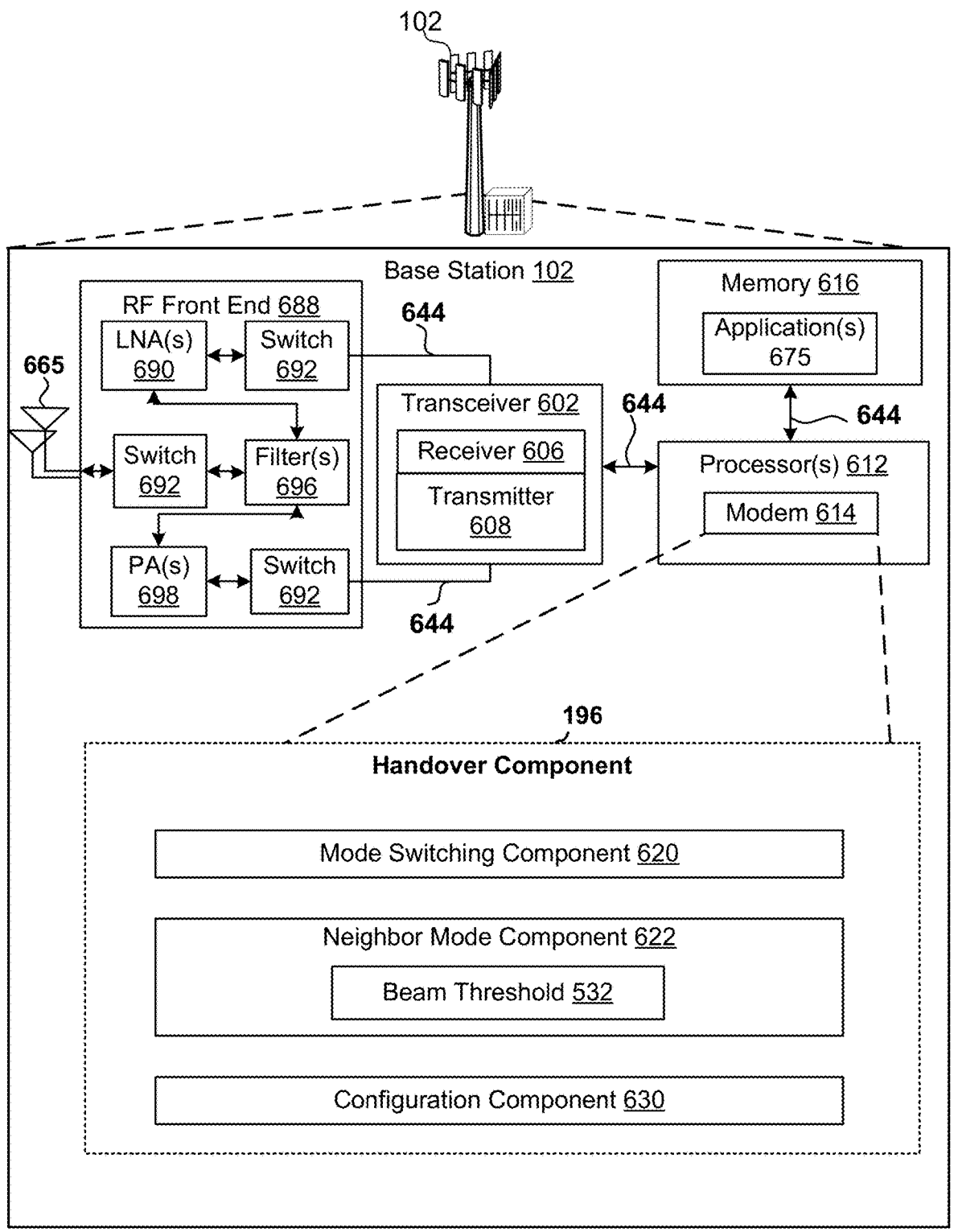
FIG. 6 is a schematic diagram of example components of the base station of FIG. 1.

In certain aspects, one or more UEs 104 may be configured for adaptive transmission modes based on UE elevation, altitude, and/or number of base stations detected by the UE. A UE 104 may include a UAV mode component 194 that may be configured to switch the transmission mode of the UE 104 when certain conditions are satisfied. The UAV mode component 194 may communicate with a serving base station 102 to change transmission modes, for example, by initiating a handover to a cell operating in a desired transmission mode. The base station 102 may include a handover component 196 for facilitating a mode switch using a handover. Further details of the UAV mode component 194 and the handover component 196 are illustrated in FIG. 5 and FIG. 6.

The base stations 102 (collectively referred to as Evolved Universal Mobile Telecommunications System (UMTS) Terrestrial Radio Access Network (E-UTRAN)) interface with the EPC 160 or other core network through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or other core network) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell base station 102' may have a coverage area 110' that overlaps the coverage area 110 of one or more macro cell base stations 102. A network that includes both small cell base stations and macro cell base stations may be known as a heterogeneous network. A heterogeneous network may also include Home Evolved Node Base Stations (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using one or more device-to-device (D2D) communication links 192. A D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ NR and use the same 5 GHz unlicensed frequency spectrum as used by the Wi-Fi AP 150. The small cell base station 102', employing NR in an unlicensed frequency spectrum, may boost coverage to and/or increase capacity of the access network.

A gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as a mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. In an aspect, a gNB 180 operating using mmW may utilize beamforming 184 with the UE 104 to compensate for the extremely high path loss and short range. Additionally, UEs 104 performing D2D communications may operate using mmW and may also utilize beamforming 184.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), relay node, or some other suitable terminology. The base station 102 provides an access point to the EPC 160 or other core network for a UE 104. Examples of UEs 104 include a cellular phone, a smart phone, a UAV controller, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In mmW communication systems (e.g., access network 100), a line of sight (LOS) may be needed between a transmitting device (e.g., base station 102) and a receiving device (e.g., UE 104), or between two UEs 104. Frequency is very high (e.g., greater than 28 GHz) in mmW communication systems which means that beam widths are very small, as the beam widths are inversely proportional to the frequency of the waves or carriers transmitted by an antenna of the transmitting device. Beam widths used in mmW communications are often termed as "pencil beams." The small wavelengths may result in many objects or materials acting as obstacles. Therefore, LOS between the transmitter and receiver may be required unless a reflected path is strong enough to transmit data. Further, in some examples, base stations may track UEs 104 to focus beams for communication.

Figure 2:
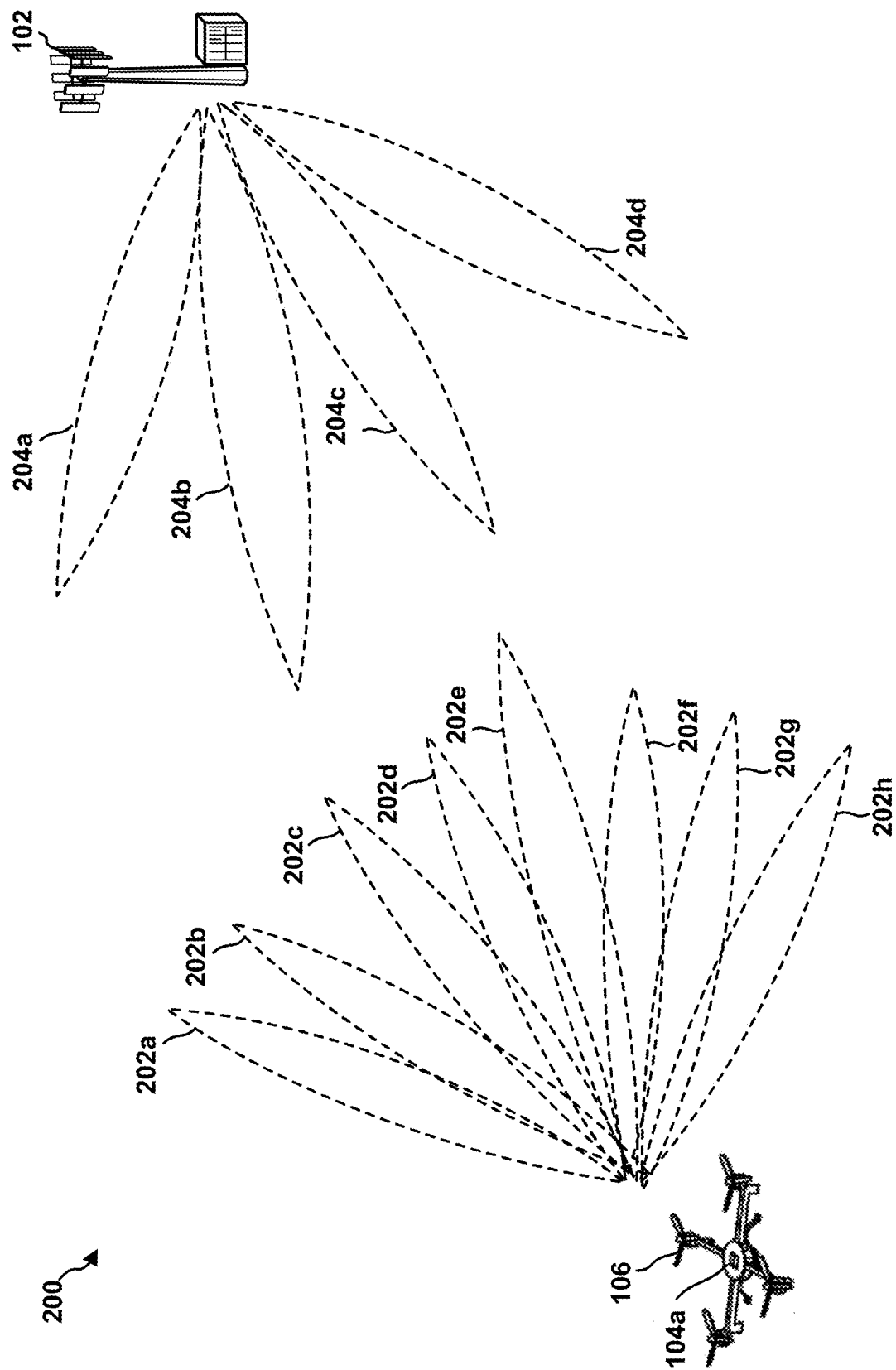
FIG. 2 is a block diagram of an example UE communicating with a base station using beamforming.

FIG. 2 is a diagram 200 illustrating a UE 104a located on a UAV 106 in communication with base station 102. Referring to FIG. 2, the UE 104a may transmit one or more beams 202a, 202b, 202c, 202d, 202e, 202f, 202g, or 202h to the base station 102, where the beams may be in one or more directions. The base station 102 may receive the one or more beams 202a-202h in the same direction as transmitted by the UE 104a or in another direction due to reflection. The base station 102 may also transmit one or more beams 204a, 204b, 204c, and 204d to the UE 104a, where the beams may be in one or more directions. The UE 104a may receive the one or more beams 204a-204d in the same direction as transmitted by the base station 102 or in another direction due to reflection. The UE 104a and/or the base station 102 may perform beam training to determine the best beams for each of the UE 104a/the base station 102 to transmit/receive.

The use of beamforming may reduce uplink interference to neighboring base stations. Because the beams 202a, 202b, 202c, 202d, 202e, 202f, 202g, or 202h are relatively narrow and transmitted only in the direction of the intended receiver of base station 102, the beams 202a, 202b, 202c, 202d, 202e, 202f, 202g, or 202h may impart little interference to the other base stations.

Figure 3:
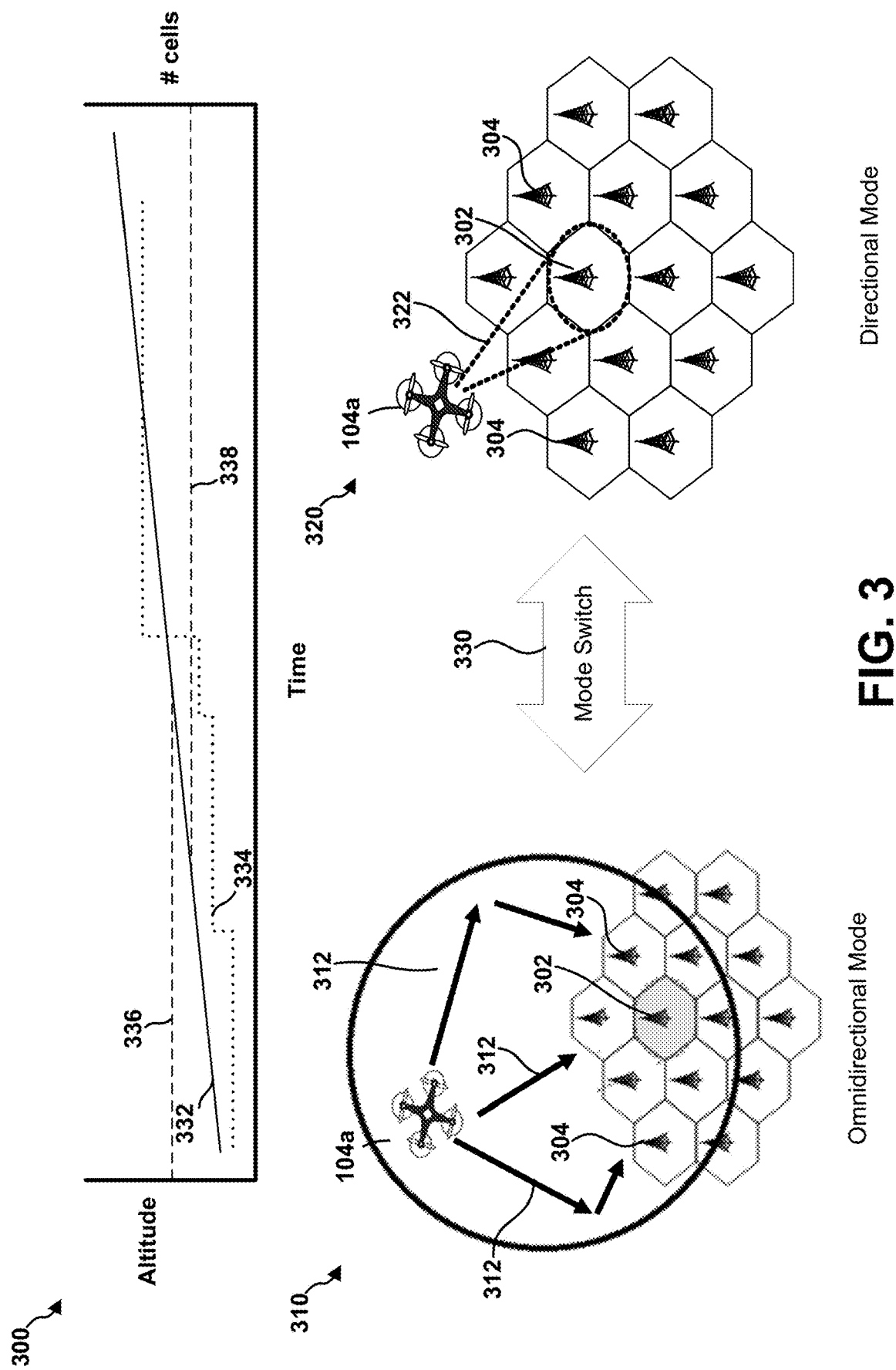
FIG. 3 is a schematic diagram illustrating an omnidirectional mode and a directional mode.

FIG. 3 is a schematic diagram 300 showing a mode switch between an omnidirectional transmit mode 310 and a directional transmit mode 320. In the omnidirectional transmit mode 310, the UE 104a may transmit signals 312 in multiple directions using one or more omnidirectional antennas. The signals 312 may reflect off buildings, scatterers, urban clutter, or other obstacles to follow different paths. At low altitudes, the reflected signals may be useful for establishing a signal path to a serving cell 302 when no line-of-sight is available. At higher altitudes, however, the signals 312 being transmitted in multiple directions and being reflected may cause interference to one or more neighbor cells 304.

In the directional transmit mode 320, the UE 104a may transmit a beam 322 in the direction of the serving cell 302. The neighbor cells 304 may not be located in the beam path and may experience little interference from the beam 322. At a low altitude, however, the beam 322 may be blocked by an obstacle such as a building. A reflected beam may travel in a direction away from the serving cell 302. Accordingly, the serving cell 302 may not receive the beam 322. At a high altitude, however, the UE 104a is more likely to have a line-of-sight to the serving cell 302 because fewer obstacles are present at high altitudes.

The UE 104 may trigger a mode switch 330 in response to conditions indicating that one of the omnidirectional transmit mode 310 or the directional transmit mode 320 is preferable for a current condition. In an aspect, the UE 104a may determine a preferable transmit mode based on one or more thresholds. In an example, an altitude 332 of a UE 104a may increase over time, for example, as the UE 104 is ascending. A number of cells 334 detected by the UE 104a may be correlated with the altitude 332 of the UE 104a. That is, as the altitude of the UE 104a increases, the UE 104a may develop a line of sight to more base stations 102 providing cells (e.g., neighbor cells 304) and receive a signal strong enough to detect.

The elevation threshold 336 may be an elevation or altitude threshold. In an aspect, the term altitude may be used to refer to a height above sea level. In an aspect, the term elevation may be used to refer to a height above ground level. Either elevation or altitude may be used to define the elevation threshold 336. In an aspect, a threshold based on elevation may be consistent across geographic areas, even as the altitude of ground level may vary. The interference caused by an aerial UE 104 at a particular elevation to base stations located relatively close to ground level (e.g., on towers) may be relatively stable compared to the difference of interference caused to a base station at sea level and a base station located on a mountain. That is, if a constant altitude threshold were used, the base station located at sea level may experience interference from UEs operating in the omnidirectional mode below the altitude threshold, whereas the base station located on a mountain above the altitude threshold may only communicate with aerial UEs using directional transmit mode. Accordingly, if an altitude is used for the elevation threshold, the value may vary based on geographic location. The elevation threshold 336 may be pre-determined (e.g., set by a standard) or dynamically configured for the UE 104a. For example, the serving cell 302 may indicate the elevation threshold 336 in broadcast information (MIB or SIB) or in RRC signaling. The elevation threshold 336 may be selected based on physical characteristics of a geographic coverage area 110, regulatory requirements, and/or operator preference. For example, the elevation threshold 336 may be empirically determined for a geographic coverage area 110 based on average or maximum height of buildings. The elevation threshold 336 may be determined to optimize a measured parameter of one or more base stations (e.g., using coordinated multi-point communications).

A cell threshold 338 may be a threshold number of cells detected by the UE 104a. The number of cells 334 detected by the UE 104a may also indicate a number of cells likely to experience uplink interference from a UE 104a using the omnidirectional transmit mode 310. Similar to the elevation threshold 336, the cell threshold 338 may be pre-determined or dynamically configured, based on physical characteristics of a geographic coverage area 110, regulatory requirements, and/or operator preference, and/or empirically selected. The UE 104a may trigger the mode switch 330 in response to the UE 104a satisfying one or both of the elevation threshold 336 and the cell threshold 338.

Figure 4:
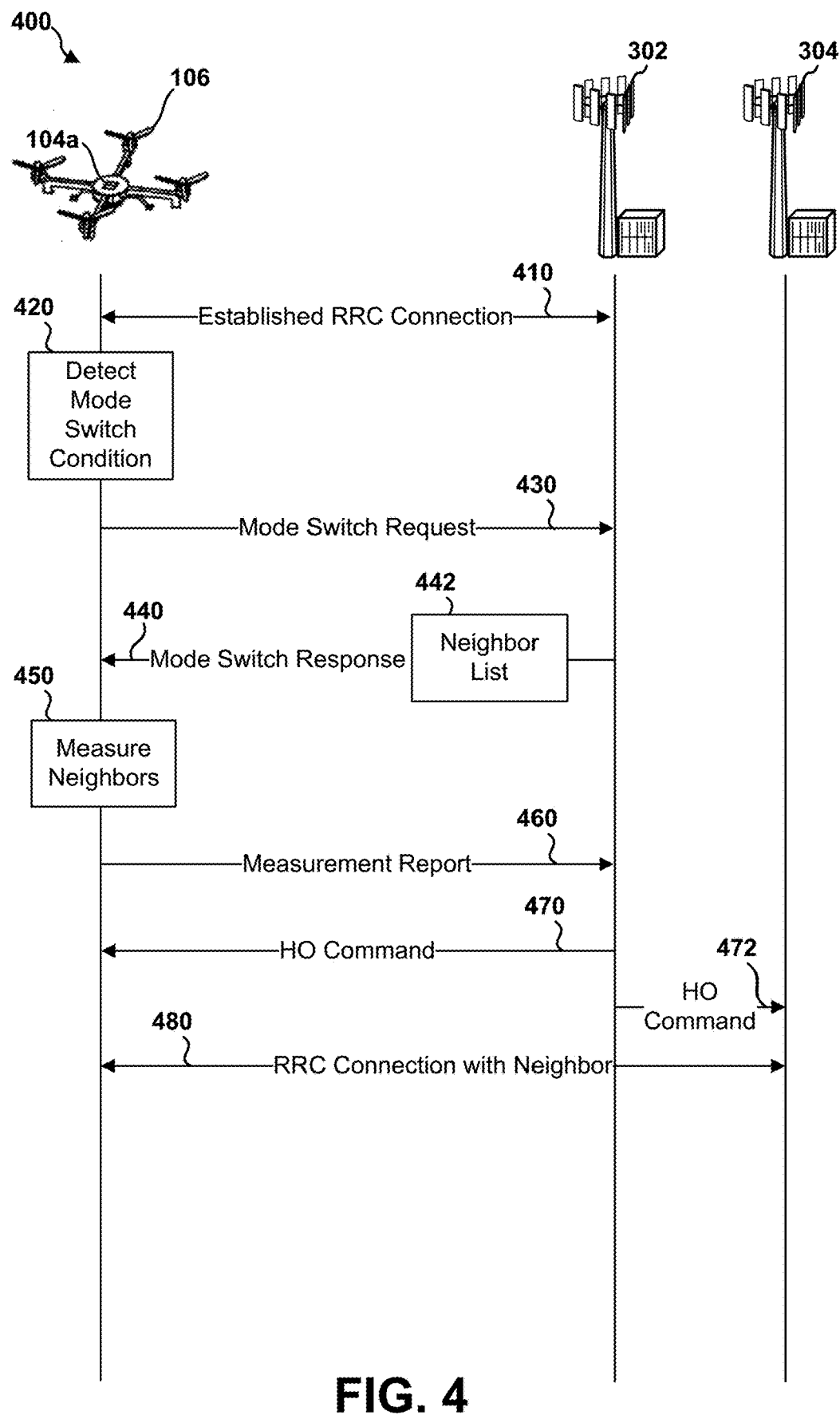
FIG. 4 is a message diagram showing an example of establishing a communication channel between UEs using a relay node.

FIG. 4 is a message diagram showing a mode switch operation 400 between a UE 104a and serving cell 302 that results in a handover to a neighbor cell 304. In an aspect, the first UE 104a may be located on a UAV 106. The serving cell 302 may be located at a base station 102. In an aspect, the neighbor cell 304 may also be located at the base station 102 (e.g., utilizing a different frequency) or may be located at a different base station.

Initially, the UE 104a may communicate with the serving cell 302 over an established RRC connection 410. For example, the established RRC connection 410 may be established when the UE 104a acquires the serving cell 302, initiates a traffic session using a random access procedure, or is handed over to the serving cell 302. The established RRC connection may use a first transmission mode. For example, the first transmission mode may be the omnidirectional transmission mode 310. The serving cell 302 may configure the UE 104a with the elevation threshold 336 and the cell threshold 338 over the air, for example, using the established RRC connection 410. In an aspect, the configuration of the threshold can be done periodically based on change in UE location or when the UE 104a changes cell. In another aspect, the network (e.g., serving cell 302) can provide the thresholds for different cells and/or locations (e.g., latitude and longitude), and UE 104a may select the correct thresholds based on the current cell or current location. In an aspect, for example, the network may provide a database mapping locations to elevations and/or interference estimates (e.g. a number of cells). The UE 104a may predict that one of the elevation threshold 336 or the cell threshold 338 will be satisfied based on a current location. In an aspect, the UE 104a may perform a proactive mode switch based on the prediction. In an aspect, the UE 104a may contribute to the database by providing samples of location, elevation, and interference estimates to the network. In another aspect, the UE 104a may alter flight path planning based on the database. For example, if the UE 104a does not support a transmit mode to be utilized in a particular location at a particular elevation, the UE 104a may alter a flight path to avoid a location and/or elevation where the non-supported transmit mode is required.

In an aspect, the UE 104a may measure received interference. For example, the UE 104a may measure the interference during an unscheduled period, or may measure interference to a received reference signal. The UE 104 may include the measured interference in the samples provided to the network for updating the database. The UE 104a may alter a flight path based on interference predicted based on the database. For example, the UE 104a may select a flight path that avoids locations where the database indicates measured interference above a received interference threshold. In another aspect, the configuration may indicate an interference limited region where the UE is only permitted to transmit emergency transmissions. An emergency transmission may refer to a communication which is time critical and cannot be postponed until the interference limited region is over. For example, the UE 104a reporting an anomaly identified by a surveillance UAV may be considered an 'emergency transmission'. In an aspect, the status as an emergency transmission may be indicated by a higher layer application generating content for the transmission. The emergency transmission may be assigned to a high priority bearer and/or logical channel to facilitate transmission in the interference limited region.

During operation, the UE 104a may detect a mode switch condition 420. The mode switch condition may be based on the elevation threshold 336 and/or the cell threshold 338. For example, the UE 104a may compare a measured or estimated altitude to the elevation threshold 336 and/or compare a detected number of base stations to the cell threshold 338. The mode switch condition may be satisfied when one or both of the thresholds is exceeded, depending on a configuration of UE 104a.

In response to detecting the mode switch condition 420, the UE 104a may transmit a mode switch request 430 to the serving cell 302. The mode switch request may be, for example, an RRC command such as a reconfiguration request indicating the mode switch condition 420. In an aspect, the mode switch request 430 may indicate a desired transmit mode determine by the UE 104a. For example the transmit modes may be assigned a code, and the code may be indicated in an information element.

In response to the mode switch request 430, the serving cell 302 may transmit a mode switch response 440 to the UE 104a. The mode switch response 440 may include a neighbor list 442. The neighbor list 442 may be a list of neighbor cells that utilize the desired transmit mode. For example, the neighbor list 442 may identify neighbor cells 304 that are configured with a threshold number of actually supported beams. The neighbor list 442 may identify the neighbor cells by operating frequency of the neighbor cell 304.

In response to receiving the mode switch response 440, at action 450, the UE 104a may measure neighbor cells included on the neighbor list 442. For example, the UE 104a may measure a received signal strength and/or received signal quality of the neighbor cells including neighbor cell 304. Additionally, the UE 104 may determine a beam configuration of each neighbor cell 304. For example, the UE 104 may determine an actual number of supported beams for each neighbor cell 304. In an aspect, the actual number of supported beams may be broadcast by each neighbor cell 304 in system information. The UE 104 may cache the cell beam configurations for use when a mode switch condition is detected.

The UE 104a may transmit a measurement report 460 to the serving base station 102. The measurement report 460 may include mode switch measurement results. The measurement report 460 may rank the neighbor cells. The measurement report 460 may also indicate one or more measurement events based on the measured neighbor cells. For example, the measurement report 460 may indicate that one of the neighbor cells 304 has a better received signal strength than the serving cell 302. In an aspect, the UE 104a may alter the measurement report to ensure that measurement event is reported and that a cell utilizing the desired transmit mode is indicated as the best cell. For example, when the UE 104 is switching to a directional transmit mode, the measurement report 460 may rank a neighbor cell 304 that satisfies a signal strength threshold and is configured with the greatest actual number of supported beams as the best cell.

In response to the measurement report 460, the serving cell 302 may transmit a handover command 470 to the UE 104a. In an aspect, the handover command 470 may be or may include a RRC reconfiguration request with case as 'mode switch request.' The handover (HO) command may specify the indicated neighbor cell 304 as the new serving cell. The serving cell 302 may also transmit a handover command 472 to the indicated neighbor cell 304.

In response to the handover commands 470, 472, the UE 104a and neighbor cell 304 may establish an RRC connection 480 using a handover procedure. The neighbor cell 304 may utilize the desired transmit mode. Accordingly, the UE 104a may switch transmit modes to communicate with the neighbor cell 304.

Referring to FIG. 5, the UAV mode component 194 may include a monitoring component 520 for monitoring one or more characteristics of the UE 104 such as an altitude, elevation, or number of detected cells, a condition detecting component 526 for determining whether the UE 104 has satisfied a mode switch condition, and a mode switching component 528 for performing a mode switch operation. The UAV mode component 194 may include a flight path component 534 for altering a flight path based on a predicted mode.

The monitoring component 520 may include, for example, an altitude component 522 for monitoring an altitude or elevation of the UE 104 and a cell counting component 524 for monitoring a number of cells detected by the UE 104. The altitude component 522 may include, for example, an altimeter that measures a current altitude of the UE 104 based on, for example, barometric pressure or GPS signals. The cell counting component 524 may determine a total number of cells detected by the UE 104. In an aspect, for example, the UE 104 may periodically scan one or more frequency bands and determine unique cells on each frequency band. For example, the transceiver 502 may receive synchronization signal blocks on each frequency band and the cell counting component 524 may count a number of cells having unique identifiers. In an aspect, the scanning may be based on a neighbor list provided by a current serving cell. In another aspect, the cell counting component 524 may only count cells detected on a frequency of the serving cell, as those cells are most likely to experience uplink interference from the UE 104.

The condition detecting component 526 may include hardware, firmware, and/or software executable by a processor and may be configured to determine whether the UE 104 has satisfied a mode switch condition. In an aspect, the condition detecting component 526 may be configured with the elevation threshold 336 and the cell threshold 338. The condition detecting component 526 may receive the monitored characteristics (e.g., elevation or number of detected cells) from the monitoring component 520 and compare the monitored characteristics with the elevation threshold 336 and the cell threshold 338. For example, the condition detecting component 526 may compare an altitude from the altitude component 522 with the elevation threshold and compare a number of detected cells from the cell counting component 524 with the cell threshold 338. In an aspect, the condition detecting component 526 may determine that a mode switch condition has occurred when the UE 104 is in an omnidirectional transmit mode 310 and one or both of the elevation threshold 336 or the cell threshold 338 has been exceeded. In another aspect, the condition detecting component 526 may determine that the UE has satisfied a mode switch condition when the UE 104 is operating in the directional transmit mode 320 and neither of the elevation threshold 336 or the cell threshold 338 is exceeded.

The mode switching component 528 may include hardware, firmware, and/or software executable by a processor and may be configured to perform a mode switching operation for a UE 104, for example, as described above with respect to FIG. 4. That is, the mode switching component 528 may perform one or more of transmitting a mode switch request, receiving a neighbor list, measuring neighbor cells, adjusting a measurement report, transmitting a measurement report, receiving a handover command, and establishing an RRC connection with a neighbor cell. In an aspect, the mode switching component 528 may include a signal strength threshold 530 and a beam threshold 532 used to select a best cell for switching to a directional transmit mode. For example, the signal strength threshold 530 may be a minimum signal strength for maintaining current communications or a preconfigured minimum signal strength. The beam threshold 532 may be a minimum number of actually supported beams to be considered a directional transmit mode. For example, in an aspect, the beam threshold 532 may be 4, 8, 16, or 32 beams. The mode switching component 528 may select a neighbor cell 304 for a directional transmit mode that has the greatest actual number of supported beams (e.g., by ranking the neighbor cell 304 highest in the measurement report). The flight path component 534 may include a prediction component 536 that determines a predicted elevation and/or a predicted number of cells for a location on a planned flight path. The prediction component 536 may determine the predicted elevation based on a planned flight path indicating the elevation. The prediction component 536 may determine the predicted number of cells based on information included in a configuration provided by the serving base station. For example, the configuration may include samples of numbers of cells detected by other UEs at a location, interference detected at the location, and elevation. The flight path component 534 may include a path alteration component 538 that alters a flight path to avoid a mode switching operation, for example, by avoiding a location where the predicted elevation, the predicted interference, or the predicted number of cells exceeds a respective threshold. For example, the interference level may be based on a UE capability (e.g., an amount of interference the UE 104a can cancel).

The handover component 196, shown in FIG. 6, may include a mode switching component 620 for performing a mode switching operation at a base station and a neighbor mode component for determining one or more neighbor cells using a desired transmit mode.

The mode switching component 620 may include hardware, firmware, and/or software executable by a processor and may be configured to perform a mode switching operation for a serving cell 302, for example, as described above with respect to FIG. 4. That is, the mode switching component 620 may perform one or more of receiving a mode switch request, generating a neighbor list, transmitting a neighbor list, receiving a measurement report, transmitting a handover command to a UE and transmitting a handover command to a new serving cell.

The neighbor mode component 622 may determine one or more neighbor cells that satisfy a desired transmit mode of a UE, for example, as indicated in a mode switch request. The serving cell 302 may be configured with a set of neighbor cells. The neighbor mode component 622 may determine a transmit mode to be used with each neighbor cell. For example, the configuration of each neighbor cell may indicate the transmit mode. In another example, the neighbor mode component 622 may determine the transmit mode for a neighbor cell based on an uplink frequency for the cell. For example, if the uplink frequency is greater than 28 GHz, the neighbor mode component 622 may determine that the directional transmit mode 320 is used. As another example, if the uplink frequency is less than 6 GHz, the neighbor mode component 622 may determine that an omnidirectional transmit mode 310 is used. In an aspect, if the uplink frequency is between 6 GHz and 28 GHz, the neighbor cell may be configured to use either transmit mode. In an aspect, a maximum number of beams supported by each cell increases with frequency. For example, below 6 GHz up to 4 beams may be supported, for 6 GHz-28 GHz up to 8 beams may be supported, and for frequencies greater than 28 GHz up to 64 beams may be supported. In an aspect, each cell may be configured with an actual number of supported beams. Each cell may broadcast the actual number of supported beams to UEs and/or share the actual number of supported beams with other cells via backhaul links 134. The neighbor mode component 622 may determine one or more neighbor cells that satisfy a desired transmit mode of a UE based on the actual number of supported beams. For example, the neighbor mode component 622 may identify neighbor cells that satisfy the beam threshold 532.

In an aspect, the serving base station 102 may operate the neighbor mode component 622 to determine which cell to switch to based on the UE measurement report along with knowledge of supported beams for each cell. For example, measurements of 2 cells between 6 GHz and 28 GHz might be identical, but the cells may support a different number of beams. In an aspect, the neighbor mode component 622 may select the cell which supports a larger number of beams for the directional transmit mode (as each beam would be more directional and narrower to reduce interference).

The handover component 196 may include a configuration component 630 that transmits a configuration including at least an elevation threshold or a cell threshold to a UE 104*a*. The configuration may be based on a current location of the UE. In an aspect, the configuration may include samples of interference or numbers of cells detected at location and elevation. For example, the configuration component 630 may maintain a database of samples received from UEs and provide the samples with the configuration for a location that the UE is approaching.

Figure 7:
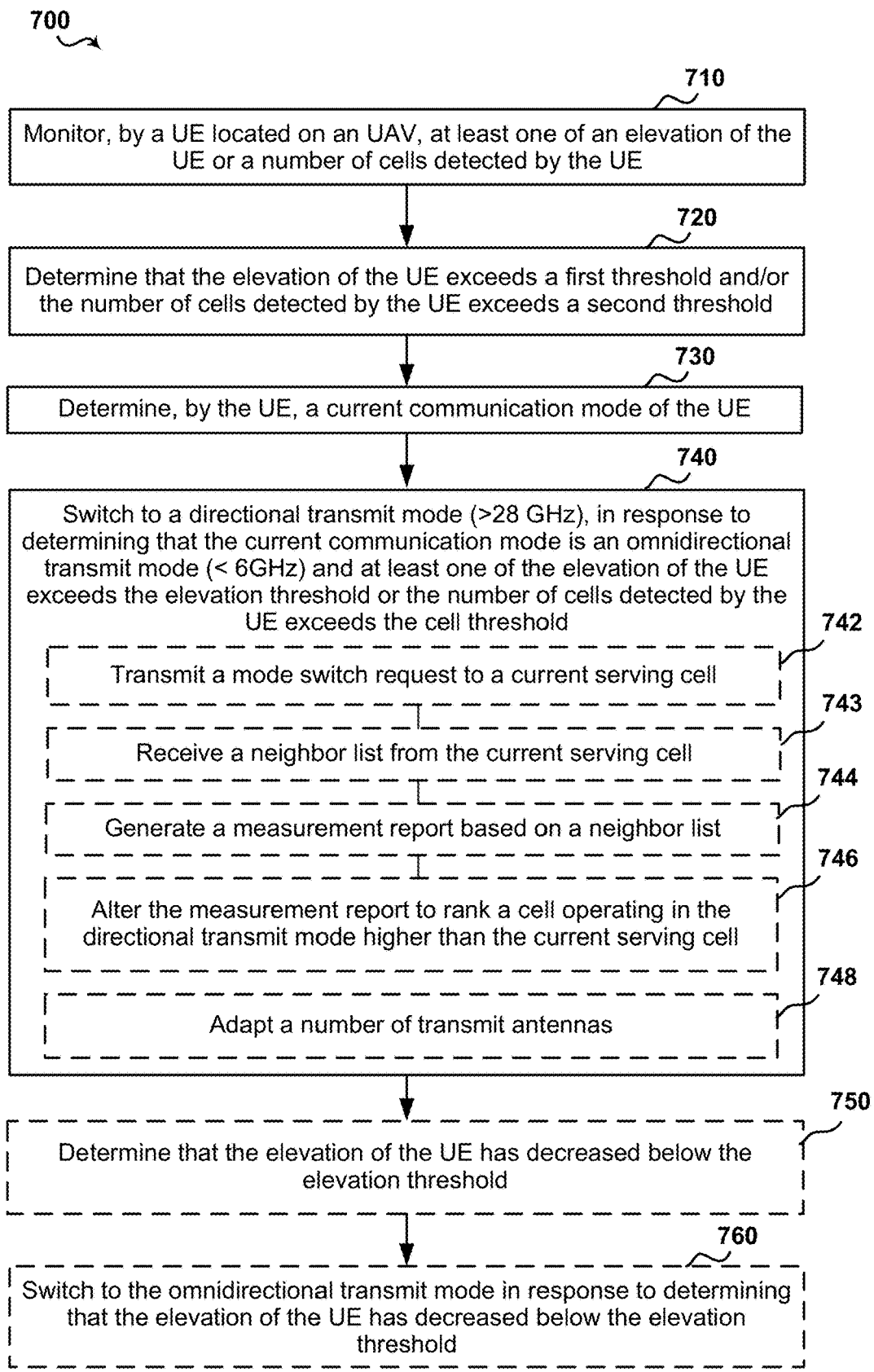
FIG. 7 is a flowchart of a method of wireless communication by a UE.

FIG. 7 is a flowchart of a method 700 of wireless communication for a UE 104*a*. The method 700 may be performed by an apparatus such as the UAV mode component 194 in conjunction with the processor 512 of the UE 104. Optional blocks are shown in dashed lines.

At block 710, the method 700 may include monitoring, by a UE located on an UAV, at least one of an elevation of the UE or a number of cells detected by the UE. In an aspect, for example, the UE 104, the processor 512, and/or the modem 514 may execute the UAV mode component 194 and/or the monitoring component 520 to monitor the elevation of the UE and/or the number of cells detected by the UE. For example, the UE 104, the processor 512, and/or the modem 514 may execute the altitude component 522 to monitor the elevation and/or the cell counting component 524 to monitor the number of cells detected by the UE, as discussed above with respect to FIG. 5. Thus, the UE 104, the processor 512, and/or the modem 514 executing the UAV mode component 194 and/or the monitoring component 520 or one of its subcomponents may define the means for monitoring, by a UE located on an UAV, at least one of an elevation of the UE or a number of cells detected by the UE.

At block 720, the method 700 may include determining that the elevation of the UE exceeds an elevation threshold and/or the number of cells detected by the UE exceeds a cell threshold. In an aspect, for example the UE 104, the processor 512, and/or the modem 514 may execute the UAV mode component 194 and/or the condition detecting component 526 to determine that the elevation of the UE 104 exceeds the elevation threshold 336 and/or the number of cells detected by the UE 104 exceeds the cell threshold 338. For instance, the condition detecting component 526 may compare the elevation monitored by the altitude component 522 to the elevation threshold 336. As another example, the condition detecting component 526 may compare the number of cells detected by the cell counting component 524 with the cell threshold 338. Additional details regarding determining that the elevation of the UE exceeds an elevation threshold and/or the number of cells detected by the UE exceeds a cell threshold are discussed above with reference to FIG. 5. Thus, the UE 104, the processor 512, and/or the modem 514 executing the UAV mode component 194 and/or the condition detecting component 526 or one of its subcomponents may define the means for determining that the elevation of the UE exceeds an elevation threshold and/or the number of cells detected by the UE exceeds a cell threshold.

At block 730, the method 700 may include determining, by the UE, a current communication mode of the UE. In an aspect, for example, the UAV mode component 194 may determine the current communication mode of the UE. For example, the UE 104, the processor 512, and/or the modem 514 may execute the UAV mode component 194 to determine the current communication mode of the UE based on a configured uplink frequency or a configured beamforming mode. For example, if the configured uplink frequency is greater than 28 GHz, the UAV mode component 194 may determine that the current communication mode of the UE is the directional transmit mode. In contrast, if the configured uplink frequency is less than 28 GHz, the UAV mode component 194 may determine that the current communication mode of the UE is the omnidirectional transmit mode. Additional details regarding determining, by the UE, a current communication mode of the UE are discussed above with reference to FIG. 5. Thus, the UE 104, the processor 512, and/or the modem 514 executing the UAV mode component 194 or one of its subcomponents may define the means for determining, by the UE, a current communication mode of the UE.

At block 740, the method 700 may include switching to a directional transmit mode, in response to determining that the current communication mode is an omnidirectional transmit mode and the elevation of the UE exceeds the elevation threshold or the number of cells detected by the UE exceeds the cell threshold. In an aspect, for example, the UE 104, the processor 512, and/or the modem 514 may execute the UAV mode component 194 and/or the mode switching component 528 to switch to the directional transmit mode 320, in response to determining that the current communication mode is the omnidirectional transmit mode 310 and the elevation of the UE exceeds the elevation threshold 336 and/or the number of cells detected by the UE exceeds the cell threshold 338. The mode switching component 528 may perform a mode switching operation as described above with respect to FIG. 4 and FIG. 5. Thus, the UE 104, the processor 512, and/or the modem 514 executing the UAV mode component 194 and/or the mode switching component 528 or one of its subcomponents may define the means for switching to a directional transmit mode, in response to determining that the current communication mode is an omnidirectional transmit mode and the elevation of the UE exceeds the elevation threshold or the number of cells detected by the UE exceeds the cell threshold.

In an aspect, at block 742, the block 740 may include transmitting a mode switch request to a current serving cell. In an aspect, for example, the UE 104, the processor 512, and/or the modem 514 may execute the mode switching component 528 to transmit the mode switch request 430 to the serving cell 302. In an aspect, the mode switch request identifies a desired transmit mode. The mode switching component 528 may transmit the mode switch request 430 as an RRC reconfiguration request via the transceiver 502. Additional details regarding transmitting a mode switch request to a current serving cell are discussed above with reference to FIG. 5.

In block 743, the block 740 may include receiving a neighbor list from the serving cell. In an aspect, for example, the UE 104, the processor 512, and/or the modem 514 may execute the mode switching component 528 to receive the neighbor list from the serving cell. Receiving the neighbor list may be in response to transmitting the mode switch request. The neighbor list may include information identifying one or more neighbor cells that satisfy the mode switch request (e.g., use the desired transmit mode). In an aspect, the neighbor list may be received as an RRC measurement object. Additional details regarding receiving a neighbor list from the serving cell are discussed above with reference to FIG. 5.

In an aspect, at block 744, the block 740 may include generating a measurement report based on a neighbor list. For example, the UE 104, the processor 512, and/or the modem 514 may execute the mode switching component 528 to generate the measurement report based on the neighbor list. The mode switching component 528 may generate the measurement report based on measuring the cells at action 450 in FIG. 4. Additional details regarding generating a measurement report based on a neighbor list are discussed above with reference to FIG. 5.

In another aspect, at block 746, the block 740 may include altering the measurement report to rank a cell operating in the directional transmit mode higher than a current serving cell. In an aspect, for example, the UE 104, the processor 512, and/or the modem 514 may execute the mode switching component 528 to alter the measurement report 460 to rank a cell operating in the directional transmit mode (e.g., neighbor cell 304) higher than a current serving cell 302. Generally, if the neighbor cell 304 were higher ranked than the current serving cell 302 based on measurements, the UE 104 would send a measurement report and the current serving cell 302 would perform a handover (even without the mode switch request). In this case, however, since the mode switch is based on the mode switch conditions, and not necessarily on channel conditions, the measurement report may be altered to cause the handover. The mode switching component 528 may transmit the measurement report to the current serving cell 302, for example, as an RRC measurement report transmitted via the transceiver 502. Additional details regarding altering the measurement report to rank a cell operating in the directional transmit mode higher than a current serving cell are discussed above with reference to FIG. 5.

In another aspect, at block 748, the block 740 may include adapting a number of transmit antennas. In an aspect, for example, the UE 104, the processor 512, and/or the modem 514 may execute the mode switching component 528 to adapt the number of transmit antennas to the desired transmit mode. For example, the directional transmit mode 320 may use multiple antennas for beamforming. Accordingly, the mode switching component 528 may adapt the number of transmit antennas (e.g., by activating or deactivating antennas) when switching transmit modes. Additional details regarding adapting a number of transmit antennas are discussed above with reference to FIG. 5.

At block 750, the method 700 may optionally include determining that the elevation of the UE has decreased below the elevation threshold. In an aspect, for example, the UE 104, the processor 512, and/or the modem 514 may execute the condition detecting component 526 to determine that the elevation of the UE has decreased below the elevation threshold 336. For example, the condition detecting component 526 may compare the elevation monitored by the altitude component 522 to the elevation threshold 336. The decrease below the elevation threshold 336 may be considered a mode switch condition for changing to an omnidirectional transmit mode 310. The decrease below the elevation threshold may be configured with a minimum offset or margin to prevent frequent changes between modes when the UE elevation remains near the elevation threshold 336. Additional details determining that the elevation of the UE has decreased below the elevation threshold are discussed above with reference to FIG. 5.

At block 760, the method 700 may optionally include switching to the omnidirectional transmit mode in response to determining that the elevation of the UE has decreased below the elevation threshold. In an aspect, for example, the UE 104, the processor 512, and/or the modem 514 may execute the mode switching component 528 to switch to the omnidirectional transmit mode 320 in response to determining that the elevation of the UE 104 has decreased below the elevation threshold 336. Switching to the omnidirectional transmit mode 320 may be similar to switching to the directional transmit mode described above with respect to block 740, but altering the measurement report to rank a cell operating in the omnidirectional transmit mode higher than the current serving cell. For example, switching to the omnidirectional transmit mode may include transmitting a mode switch request to the current serving cell, receiving a neighbor list from the serving cell, generating a measurement report based on the neighbor list, altering the measurement report to rank a cell operating in the omnidirectional transmit mode higher than the current serving cell, and adapting a number of antennas. Additional details regarding switching to the omnidirectional transmit mode in response to determining that the elevation of the UE has decreased below the elevation threshold are discussed above with reference to FIG. 5.

Figure 8:
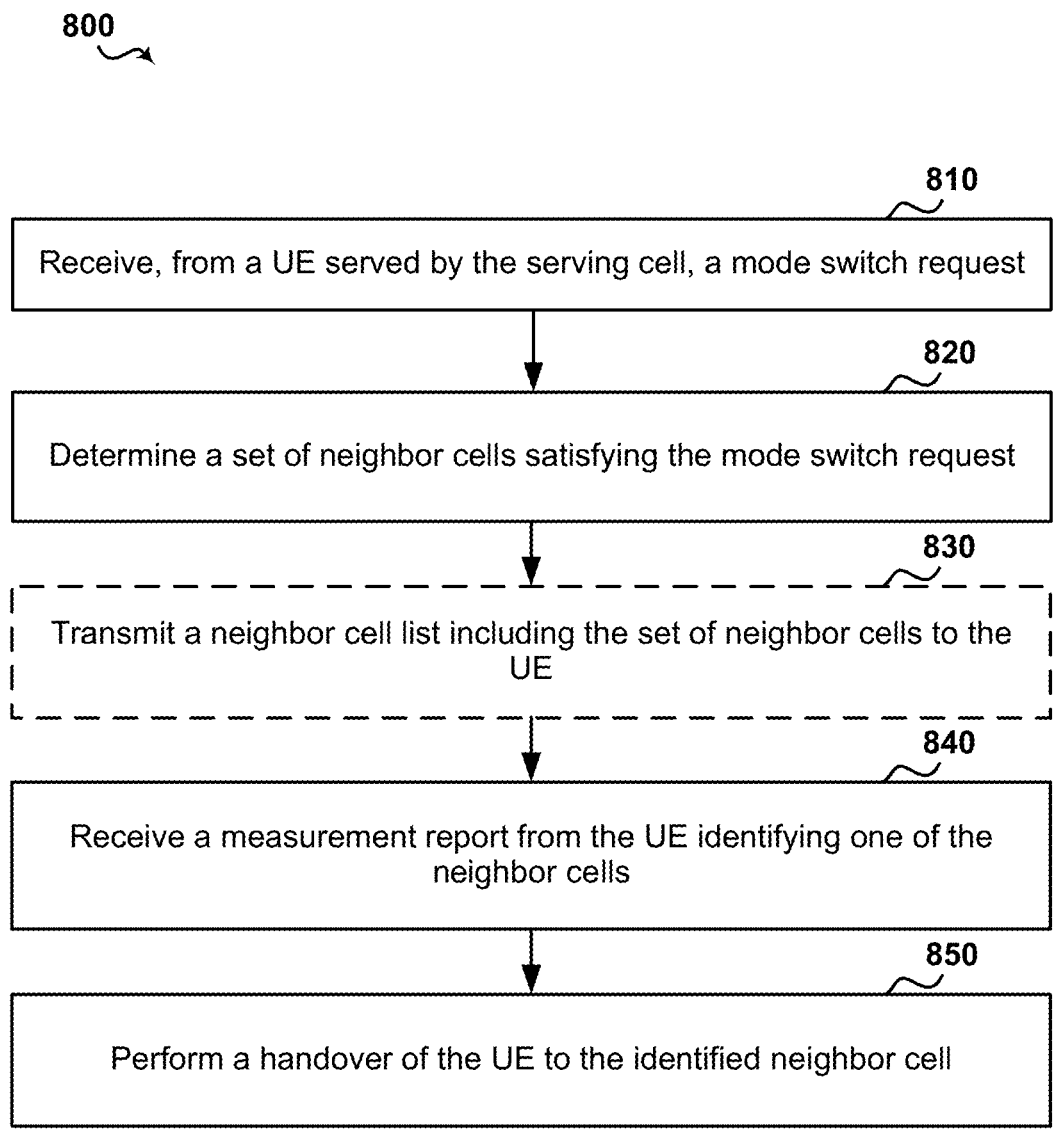
FIG. 8 is a flowchart of a method of wireless communication by a base station.

FIG. 8 is a flowchart of a method 800 of wireless communication for base station 102 such as the current serving cell 302 to facilitate a mode switch by a UE 104. The method 800 may be performed by an apparatus such as the handover component 196 of the base station 102. Optional blocks are shown in dashed lines.

In block 810, the method 800 may include receiving, from a UE served by the serving cell, a mode switch request. In an aspect, for example, the base station 102, the processor 612, and/or the modem 614 may execute the handover component 196 and/or the mode switching component 620 to receive, from the UE 104 served by the serving cell 302, the mode switch request 430. In an aspect, the mode switch request 430 may include a neighbor list including one or more neighbor cells operating in the directional transmit mode. In another aspect, the mode switch request identifies a desired transmit mode. Thus, the base station 102, the processor 612, and/or the modem 614 executing the handover component 196 and/or the mode switching component 620 or one of its subcomponents may define the means for receiving, from a UE served by the serving cell, a mode switch request.

At block 820, the method 800 may include determining a set of neighbor cells satisfying the mode switch request. In an aspect, for example, the base station 102, the processor 612, and/or the modem 614 may execute the handover component 196 and/or the neighbor mode component 622 to determine the set of neighbor cell 304 satisfying the mode switch request 430. For example, the neighbor mode component 622 may determine neighbor cells 304 matching the indicated desired transmit mode. Thus, the base station 102, the processor 612, and/or the modem 614 executing the handover component 196 and/or the neighbor mode component 622 or one of its subcomponents may define the means for determining a set of neighbor cells satisfying the mode switch request.

At block 830, the method 800 may include transmitting a neighbor cell list including the set of neighbor cells to the UE. In an aspect, for example, the base station 102, the processor 612, and/or the modem 614 may execute the handover component 196 and/or the mode switching component 620 to transmit the neighbor list 442 to the UE 104. For example, the mode switching component 620 may transmit the neighbor list 442 to the UE 104 as an RRC measurement object via the transceiver 602. Thus, the base station 102, the processor 612, and/or the modem 614 executing the handover component 196 and/or the mode switching component 620 or one of its subcomponents may define the means for transmitting a neighbor cell list including the set of neighbor cells to the UE.

At block 840, the method 800 may include receiving a measurement report from the UE identifying one of the neighbor cells. In an aspect, for example, the base station 102, the processor 612, and/or the modem 614 may execute the handover component 196 and/or the mode switching component 620 to receive the measurement report 460 from the UE 104 identifying one of the neighbor cells. For instance, the mode switching component 620 may receive the measurement report 460 as an RRC measurement report via the transceiver 602. Thus, the base station 102, the processor 612, and/or the modem 614 executing the handover component 196 and/or the mode switching component 620 or one of its subcomponents may define the means for receiving a measurement report from the UE identifying one of the neighbor cells.

At block 850, the method 800 may include performing a handover of the UE to the identified neighbor cell. In an aspect, for example, the base station 102, the processor 612, and/or the modem 614 may execute the handover component 196 and/or the mode switching component 620 to perform a handover of the UE 104 to the identified neighbor cell (e.g., neighbor cell 304). In an aspect, performing the handover may include transmitting the handover command 470 and 472, as described above with respect to FIG. 4. Thus, the base station 102, the processor 612, and/or the modem 614 executing the handover component 196 and/or the mode switching component 620 or one of its subcomponents may define the means for performing a handover of the UE to the identified neighbor cell.

Referring to FIG. 5 again, one example of an implementation of UE 104 may include a variety of components, some of which have already been described above, but including components such as one or more processors 512 and memory 516 and transceiver 502 in communication via one or more buses 544, which may operate in conjunction with modem 514, UAV mode component 194 and handover component 196 to enable one or more of the functions described herein related to switching a transmit mode of a UE located on a UAV. Further, the one or more processors 512, modem 514, memory 516, transceiver 502, RF front end 588 and one or more antennas 565, may be configured to support voice and/or data calls (simultaneously or non-simultaneously) in one or more radio access technologies.

In an aspect, the one or more processors 512 can include a modem 514 that uses one or more modem processors. The various functions related to UAV mode component 194 may be included in modem 514 and/or processors 512 and, in an aspect, can be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 514 associated with UAV mode component 194 may be performed by transceiver 502.

Also, memory 516 may be configured to store data used herein and/or local versions of applications 575, UAV mode component 194 and/or one or more of subcomponents thereof being executed by at least one processor 512. Memory 516 can include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, memory 516 may be a non-transitory computer-readable storage medium that stores one or more computer-executable codes defining UAV mode component 194 and/or one or more of subcomponents thereof, and/or data associated therewith, when UE 104 is operating at least one processor 512 to execute UAV mode component 194 and/or one or more subcomponents thereof.

Transceiver 502 may include at least one receiver 506 and at least one transmitter 508. Receiver 506 may include hardware, firmware, and/or software code executable by a processor for receiving data, the code comprising instructions and being stored in a memory (e.g., computer-readable medium). Receiver 506 may be, for example, a radio frequency (RF) receiver. In an aspect, receiver 506 may receive signals transmitted by at least one base station 102. Additionally, receiver 506 may process such received signals, and also may obtain measurements of the signals, such as, but not limited to, Ec/Io, SNR, RSRP, RSSI, etc. Transmitter 508 may include hardware, firmware, and/or software code executable by a processor for transmitting data, the code comprising instructions and being stored in a memory (e.g., computer-readable medium). A suitable example of transmitter 508 may including, but is not limited to, an RF transmitter.

Moreover, in an aspect, UE 104 may include RF front end 588, which may operate in communication with one or more antennas 565 and transceiver 502 for receiving and transmitting radio transmissions, for example, wireless communications transmitted by at least one base station 102 or wireless transmissions transmitted by UE 104. RF front end 588 may be connected to one or more antennas 565 and can include one or more low-noise amplifiers (LNAs) 590, one or more switches 592, one or more power amplifiers (PAs) 598, and one or more filters 596 for transmitting and receiving RF signals. The antennas 565 may include one or more antennas, antenna elements, and/or antenna arrays.

In an aspect, LNA 590 can amplify a received signal at a desired output level. In an aspect, each LNA 590 may have a specified minimum and maximum gain values. In an aspect, RF front end 588 may use one or more switches 592 to select a particular LNA 590 and its specified gain value based on a desired gain value for a particular application.

Further, for example, one or more PA(s) 598 may be used by RF front end 588 to amplify a signal for an RF output at a desired output power level. In an aspect, each PA 598 may have specified minimum and maximum gain values. In an aspect, RF front end 588 may use one or more switches 592 to select a particular PA 598 and its specified gain value based on a desired gain value for a particular application.

Also, for example, one or more filters 596 can be used by RF front end 588 to filter a received signal to obtain an input RF signal. Similarly, in an aspect, for example, a respective filter 596 can be used to filter an output from a respective PA 598 to produce an output signal for transmission. In an aspect, each filter 596 can be connected to a specific LNA 590 and/or PA 598. In an aspect, RF front end 588 can use one or more switches 592 to select a transmit or receive path using a specified filter 596, LNA 590, and/or PA 598, based on a configuration as specified by transceiver 502 and/or processor 512.

As such, transceiver 502 may be configured to transmit and receive wireless signals through one or more antennas 565 via RF front end 588. In an aspect, transceiver may be tuned to operate at specified frequencies such that UE 104 can communicate with, for example, one or more base stations 102 or one or more cells associated with one or more base stations 102. In an aspect, for example, modem 514 can configure transceiver 502 to operate at a specified frequency and power level based on the UE configuration of the UE 104 and the communication protocol used by modem 514.

In an aspect, modem 514 can be a multiband-multimode modem, which can process digital data and communicate with transceiver 502 such that the digital data is sent and received using transceiver 502. In an aspect, modem 514 can be multiband and be configured to support multiple frequency bands for a specific communications protocol. In an aspect, modem 514 can be multimode and be configured to support multiple operating networks and communications protocols. In an aspect, modem 514 can control one or more components of UE 104 (e.g., RF front end 588, transceiver 502) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

Referring to FIG. 6, one example of an implementation of base station 102 may include a variety of components, some of which have already been described above, but including components such as one or more processors 612 and memory 616 and transceiver 602 in communication via one or more buses 644, which may operate in conjunction with modem 614 and handover component to enable one or more of the functions described herein related to facilitating a mode switch of a UE located on a UAV.

The transceiver 602, receiver 606, transmitter 608, one or more processors 612, memory 616, applications 675, buses 644, RF front end 688, LNAs 690, switches 692, filters 696, PAs 698, and one or more antennas 665 may be the same as or similar to the corresponding components of UE 104, as described above, but configured or otherwise programmed for base station operations as opposed to UE operations.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Some Further Example Embodiments

An example method of wireless communication, comprising: monitoring, by an aerial user equipment (UE), located on an unmanned aerial vehicle (UAV), at least one of an elevation of the UE or a number of cells detected by the UE; determining that the elevation of the UE exceeds an elevation threshold or the number of cells detected by the UE exceeds a cell threshold; determining, by the UE, a current communication mode of the UE; and switching to a directional transmit mode, in response to determining that the current communication mode is an omnidirectional transmit mode and at least one of the elevation of the UE exceeds the elevation threshold or the number of cells detected by the UE exceeds the cell threshold.

The above example method, wherein switching to the directional transmit mode comprises changing to a neighbor cell measured with a signal strength satisfying a signal strength threshold and supporting a greatest number of beams among neighbor cells.

Any of the above example methods, further comprising: determining that the elevation of the UE has decreased below the elevation threshold; and switching to the omnidirectional transmit mode in response to determining that the elevation of the UE has decreased below the elevation threshold.

Any of the above example methods, wherein switching to a directional transmit mode comprises transmitting a mode switch request to a current serving cell.

Any of the above example methods, wherein switching to a directional transmit mode further comprises: receiving, in response to the mode switch request, a neighbor list including one or more neighbor cells operating in the directional transmit mode; measuring a received signal strength or received signal quality of the one or more neighbor cells; reporting the measured received signal strength or signal quality of the one or more neighbor cells; and receiving a command to change to one of the one or more neighbor cells operating in the directional transmit mode.

Any of the above example methods, further comprising receiving a configuration from a serving base station including the elevation threshold and the cell threshold.

Any of the above example methods, wherein switching to a directional transmit mode comprises: generating a measurement report based on measurements of neighbor cells; altering the measurement report to rank a neighbor cell operating in the directional transmit mode higher than a current serving cell; and transmitting the measurement report to a current serving cell.

Any of the above example methods, wherein altering the measurement report comprises selecting a neighbor cell having a greatest number of actually supported beams according to cached configuration information as the neighbor cell operating in the directional transmit mode ranked higher than the current serving cell.

Any of the above example methods, wherein switching to a directional transmit mode comprises adapting a number of transmit antennas.

Any of the above example methods, wherein the UE transmits at a frequency greater than 28 GHz in the directional transmit mode.

Any of the above example methods, wherein the UE transmits at a frequency less than 6 GHz in the omnidirectional transmit mode.

A first UE located on an UAV for wireless communication, comprising: a memory; and a processor in communication with the memory, wherein the processor is configured to: monitor, by the user equipment (UE) located on the UAV, at least one of an elevation of the UE or a number of cells detected by the UE; determine that the elevation of the UE exceeds an elevation threshold or the number of cells detected by the UE exceeds a cell threshold; determine, by the UE, a current communication mode of the UE; and switch to a directional transmit mode, in response to determining that the UE is operating in an omnidirectional transmit mode and at least one of the elevation of the UE exceeds the elevation threshold or the number of cells detected by the UE exceeds the cell threshold.

The above first UE, wherein the processor is configured to change to a neighbor cell measured with a signal strength satisfying a signal strength threshold and supporting a greatest number of beams among neighbor cells.

Any of the above first UEs, wherein the processor is configured to: determine that the elevation of the UE has decreased below the elevation threshold; and switch to the omnidirectional transmit mode in response to determining that the elevation of the UE has decreased below the elevation threshold.

Any of the above first UEs, wherein the processor is configured to transmit a mode switch request to a current serving cell to switch to the directional transmit mode.

Any of the above first UEs, wherein to switch to the directional transmit mode, the processor is configured to: receive, in response to the mode switch request, a neighbor list including one or more neighbor cells operating in the directional transmit mode; measure a received signal strength or received signal quality of the one or more neighbor cells; report the measured received signal strength or signal quality of the one or more neighbor cells; and receive a command to change to one of the one or more neighbor cells operating in the directional transmit mode.

Any of the above first UEs, wherein the processor is configured to receive a configuration from a serving base station including the elevation threshold and the cell threshold.

Any of the above first UEs, wherein to switch to a directional transmit mode, the processor is configured to: generate a measurement report based on measurements of neighbor cells; alter the measurement report to rank a neighbor cell operating in the directional transmit mode higher than a current serving cell; and transmit the measurement report to a current serving cell.

Any of the above first UEs, wherein the processor is configured to select a neighbor cell having a greatest number of actually supported beams according to cached configuration information as the neighbor cell operating in the directional transmit mode ranked higher than the current serving cell.

Any of the above first UEs, wherein the processor is configured to adapt a number of transmit antennas.

Any of the above first UEs, wherein the UE transmits at a frequency greater than 28 GHz in the directional transmit mode.

Any of the above first UEs, wherein the UE transmits at a frequency less than 6 GHz in the omnidirectional transmit mode.

A second UE for wireless communication, comprising: means for monitoring, by the UE located on an UAV, at least one of an elevation of the UE or a number of cells detected by the UE; means for determining that the elevation of the UE exceeds an elevation threshold or the number of cells detected by the UE exceeds a cell threshold; means for determining, by the UE, a current communication mode of the UE; and means for switching to a directional transmit mode, in response to determining that the UE is operating in an omnidirectional transmit mode and at least one of the elevation of the UE exceeds the elevation threshold or the number of cells detected by the UE exceeds the cell threshold.

The above second UE, wherein the means for switching to the directional transmit mode is configured to change to a neighbor cell measured with a signal strength satisfying a signal strength threshold and supporting a greatest number of beams among neighbor cells.

Any of the above second UEs, wherein the means for determining that the elevation of the UE exceeds the elevation threshold is further configured to determine that the elevation of the UE has decreased below the elevation threshold, and wherein the means for switching is configured to switch to the omnidirectional transmit mode in response to determining that the elevation of the UE has decreased below the elevation threshold.

Any of the above second UEs, wherein the means for switching to a directional transmit mode is configured to transmit a mode switch request to a current serving cell.

Any of the above second UEs, wherein the means for switching to a directional transmit mode is configured to: receive, in response to the mode switch request, a neighbor list including one or more neighbor cells operating in the directional transmit mode; measure received signal strength or received signal quality of the one or more neighbor cells; report the measured received signal strength or signal quality of the one or more neighbor cells; and receive a command to change to one of the one or more neighbor cells operating in the directional transmit mode.

Any of the above second UEs, wherein the means for switching to a directional transmit mode is configured to: generate a measurement report based on measurements of neighbor cells; alter the measurement report to rank a neighbor cell operating in the directional transmit mode higher than a current serving cell; and transmit the measurement report to a current serving cell.

Any of the above second UEs, wherein the means for switching to a directional transmit mode is configured to adapt a number of transmit antennas.

A computer-readable medium storing computer code executable by a processor for wireless communications, comprising code to: monitor, by an aerial user equipment (UE) while located on an unmanned aerial vehicle (UAV), at least one of an elevation of the UE or a number of cells detected by the UE; determine that the elevation of the UE exceeds an elevation threshold or the number of cells detected by the UE exceeds a cell threshold; determine, by the UE, a current communication mode of the UE; and switch to a directional transmit mode, in response to determining that the UE is operating in an omnidirectional transmit mode and at least one of the elevation of the UE exceeds the elevation threshold or the number of cells detected by the UE exceeds the cell threshold.

What is claimed is:

1. A method of wireless communications, comprising:
monitoring, by an aerial user equipment (UE), located on an unmanned aerial vehicle (UAV), at least one of an elevation of the UE or a number of cells detected by the UE;
determining that the elevation of the UE exceeds an elevation threshold or the number of cells detected by the UE exceeds a cell threshold;
determining, by the UE, a current communication mode of the UE; and
switching to a directional transmit mode, in response to determining that the current communication mode is an omnidirectional transmit mode and at least one of the elevation of the UE exceeds the elevation threshold or the number of cells detected by the UE exceeds the cell threshold, wherein switching to the directional transmit mode comprises:
generating a measurement report based on measurements of neighbor cells;
altering the measurement report to rank the neighbor cell operating in the directional transmit mode higher than a current serving cell;
transmitting the measurement report to the current serving cell; and
changing to a neighbor cell operating in the directional transmit mode.

2. The method of claim 1, wherein a signal strength of the neighbor cell satisfies a signal strength threshold and the neighbor cell supports a greatest number of beams among neighbor cells.

3. The method of claim 1, further comprising:
determining that the elevation of the UE has decreased below the elevation threshold; and
switching to the omnidirectional transmit mode in response to determining that the elevation of the UE has decreased below the elevation threshold.

4. The method of claim 1, wherein switching to a directional transmit mode comprises transmitting a mode switch request to a current serving cell.

5. A method of wireless communications, comprising:
monitoring, by an aerial user equipment (UE), located on an unmanned aerial vehicle (UAV), at least one of an elevation of the UE or a number of cells detected by the UE;
determining that the elevation of the UE exceeds an elevation threshold or the number of cells detected by the UE exceeds a cell threshold;
determining, by the UE, a current communication mode of the UE; and
switching to a directional transmit mode, in response to determining that the current communication mode is an omnidirectional transmit mode and at least one of the elevation of the UE exceeds the elevation threshold or the number of cells detected by the UE exceeds the cell threshold, wherein switching to the directional transmit mode comprises:
transmitting a mode switch request to a current serving cell;
receiving, in response to the mode switch request, a neighbor list including one or more neighbor cells operating in the directional transmit mode;
measuring a received signal strength or received signal quality of the one or more neighbor cells;
reporting the measured received signal strength or signal quality of the one or more neighbor cells;
receiving a command to change to the neighbor cell operating in the directional transmit mode; and
changing to the neighbor cell operating in the directional transmit mode.

6. The method of claim 1, further comprising receiving a configuration from a serving base station including the elevation threshold and the cell threshold, wherein the elevation threshold and the cell threshold is based on a location of the UE.

7. The method of claim 6, further comprising transmitting a sample of at least one of the elevation of the UE or the number of cells detected by the UE to the base station, wherein the configuration is based at least in part on samples provided by one or more UEs.

8. The method of claim 6, further comprising:
predicting a predicted elevation and a predicted number of cells based on a planned flight path and the configuration; and
altering a flight path to avoid a location where the predicted elevation would exceed the elevation threshold for the location or the predicted number of cells would exceed a cell threshold for the location.

9. The method of claim 8, wherein the predicting comprises predicting a predicted interference level based on the planned flight path and the configuration, and wherein altering the flight path comprises altering the flight path to avoid a location where the predicted interference level exceeds a threshold for the UE.

10. The method of claim 6, wherein the configuration indicates a high interference area where the UE is only permitted to transmit emergency transmissions.

11. The method of claim 1, wherein altering the measurement report comprises selecting a neighbor cell having a greatest number of actually supported beams according to cached configuration information as the neighbor cell operating in the directional transmit mode ranked higher than the current serving cell.

12. The method of claim 1, wherein switching to a directional transmit mode comprises adapting a number of transmit antennas.

13. The method of claim 1, wherein the UE transmits at a frequency greater than 28 GHz in the directional transmit mode.

14. The method of claim 1, wherein the UE transmits at a frequency less than 6 GHz in the omnidirectional transmit mode.

15. A user equipment (UE) located on an unmanned aerial vehicle (UAV) for wireless communication, comprising:
a memory; and
a processor in communication with the memory, wherein the processor is configured to:
monitor, by the user equipment (UE) located on the UAV, at least one of an elevation of the UE or a number of cells detected by the UE;
determine that the elevation of the UE exceeds an elevation threshold or the number of cells detected by the UE exceeds a cell threshold;
determine, by the UE, a current communication mode of the UE; and
switch to a directional transmit mode, in response to determining that the UE is operating in an omnidirectional transmit mode and at least one of the elevation of the UE exceeds the elevation threshold or the number of cells detected by the UE exceeds the cell threshold, wherein switching to the directional transmit mode comprises:
generating a measurement report based on measurements of neighbor cells;
altering the measurement report to rank the neighbor cell operating in the directional transmit mode higher than a current serving cell;
transmitting the measurement report to the current serving cell; and
changing to a neighbor cell operating in the directional transmit mode.

16. The UE of claim 15, wherein a signal strength of the neighbor cell satisfies a signal strength threshold and the neighbor cell supports a greatest number of beams among neighbor cells.

17. The UE of claim 15, wherein the processor is configured to:
determine that the elevation of the UE has decreased below the elevation threshold; and
switch to the omnidirectional transmit mode in response to determining that the elevation of the UE has decreased below the elevation threshold.

18. The UE of claim 15, wherein the processor is configured to transmit a mode switch request to a current serving cell to switch to the directional transmit mode.

19. The UE of claim 18, wherein to switch to the directional transmit mode, the processor is configured to:
receive, in response to the mode switch request, a neighbor list including one or more neighbor cells operating in the directional transmit mode;
measure a received signal strength or received signal quality of the one or more neighbor cells;
report the measured received signal strength or signal quality of the one or more neighbor cells; and
receive a command to change to the neighbor cell operating in the directional transmit mode.

20. The UE of claim 15, wherein the processor is configured to receive a configuration from a serving base station including the elevation threshold and the cell threshold.

21. The UE of claim 15, wherein the processor is configured to select a neighbor cell having a greatest number of actually supported beams according to cached configuration information as the neighbor cell operating in the directional transmit mode ranked higher than the current serving cell.

22. A user equipment (UE) for wireless communication, comprising:
means for monitoring, by the UE located on an unmanned aerial vehicle (UAV), at least one of an elevation of the UE or a number of cells detected by the UE;
means for determining that the elevation of the UE exceeds an elevation threshold or the number of cells detected by the UE exceeds a cell threshold;
means for determining, by the UE, a current communication mode of the UE; and
means for switching to a directional transmit mode, in response to determining that the UE is operating in an omnidirectional transmit mode and at least one of the elevation of the UE exceeds the elevation threshold or the number of cells detected by the UE exceeds the cell threshold, wherein the means for switching to the directional transmit mode is configured to:
generate a measurement report based on measurements of neighbor cells;
alter the measurement report to rank the neighbor cell operating in the directional transmit mode higher than a current serving cell;
transmit the measurement report to the current serving cell; and
change to a neighbor cell operating in the directional transmit mode.

23. The UE of claim 22, wherein the means for determining that the elevation of the UE exceeds the elevation threshold is further configured to determine that the elevation of the UE has decreased below the elevation threshold, and wherein the means for switching is configured to switch to the omnidirectional transmit mode in response to determining that the elevation of the UE has decreased below the elevation threshold.

24. The UE of claim 22, wherein the means for switching to a directional transmit mode is configured to transmit a mode switch request to a current serving cell.

25. The UE of claim 24, wherein the means for switching to a directional transmit mode is configured to:
receive, in response to the mode switch request, a neighbor list including one or more neighbor cells operating in the directional transmit mode;
measure received signal strength or received signal quality of the one or more neighbor cells;
report the measured received signal strength or signal quality of the one or more neighbor cells; and
receive a command to change to the neighbor cell operating in the directional transmit mode.

26. The UE of claim 22, wherein the means for switching to a directional transmit mode is configured to adapt a number of transmit antennas.

27. A non-transitory computer-readable medium storing computer code executable by a processor for wireless communications, comprising code to:
monitor, by an aerial user equipment (UE) while located on an unmanned aerial vehicle (UAV), at least one of an elevation of the UE or a number of cells detected by the UE;
determine that the elevation of the UE exceeds an elevation threshold or the number of cells detected by the UE exceeds a cell threshold;
determine, by the UE, a current communication mode of the UE; and
switch to a directional transmit mode, in response to determining that the UE is operating in an omnidirectional transmit mode and at least one of the elevation of the UE exceeds the elevation threshold or the number of cells detected by the UE exceeds the cell threshold, wherein the code to switch to the directional transmit mode comprises code to:

generate a measurement report based on measurements of neighbor cells;

alter the measurement report to rank the neighbor cell operating in the directional transmit mode higher than a current serving cell;

transmit the measurement report to the current serving cell; and change to the neighbor cell operating in the directional transmit mode.

\* \* \* \* \*